US010913404B1

(12) United States Patent
Giametta

(10) Patent No.: US 10,913,404 B1
(45) Date of Patent: Feb. 9, 2021

(54) CONCEALED TOILET

(71) Applicant: Joseph Anthony Giametta, D'Iberville, MS (US)

(72) Inventor: Joseph Anthony Giametta, D'Iberville, MS (US)

( * ) Notice: Subject to any disclaimer, the term of this patent is extended or adjusted under 35 U.S.C. 154(b) by 0 days.

(21) Appl. No.: 16/827,850

(22) Filed: Mar. 24, 2020

(51) Int. Cl.
*B60R 15/04* (2006.01)
(52) U.S. Cl.
CPC .................... *B60R 15/04* (2013.01)
(58) Field of Classification Search
CPC ........................................................ B60R 15/04
USPC ............................... 4/458, 449; 220/495.01
See application file for complete search history.

(56) References Cited

U.S. PATENT DOCUMENTS

| | | | | |
|---|---|---|---|---|
| 356,654 A * | 1/1887 | Martin | ...................... | E03D 5/01 4/321 |
| 1,412,379 A * | 4/1922 | Urban | ...................... | B60P 3/341 296/161 |
| 1,454,618 A * | 5/1923 | Northrop Banks | ..... | B60R 15/02 296/24.3 |
| 1,498,874 A * | 6/1924 | Hopkins | ................... | B60N 2/34 296/156 |
| 2,678,450 A * | 5/1954 | Simpson | .............. | B61D 35/005 4/312 |
| 3,383,713 A * | 5/1968 | Adams | ................... | A47K 11/04 4/144.1 |
| 4,261,613 A * | 4/1981 | Alford | ................... | B60P 3/1016 296/156 |
| 4,659,137 A * | 4/1987 | Chassaing | .......... | B62D 33/0612 296/190.02 |
| 4,776,631 A * | 10/1988 | Sargent | ..................... | E03D 5/01 296/156 |
| 4,785,483 A * | 11/1988 | Wise | ...................... | A47K 11/04 296/65.07 |
| 4,944,048 A * | 7/1990 | Sargent | ................... | B60R 15/04 4/323 |
| 5,083,325 A * | 1/1992 | Vitullo | ................... | A47K 11/12 4/479 |
| 5,095,556 A * | 3/1992 | Franey | ................. | A47K 17/026 4/460 |
| 5,359,737 A * | 11/1994 | Hodge | ................... | A47K 11/04 4/476 |

(Continued)

*Primary Examiner* — Lori L Baker
(74) *Attorney, Agent, or Firm* — Ashok Tankha; Lipton Weinberger & Husick

(57) ABSTRACT

A concealed toilet comprises a flexible container positioned in a cavity in a vehicle seat. A foundation member attached to the flexible container secures the flexible container to a floor pan of the vehicle via a support assembly. The support assembly comprises externally threaded rods, each having a first end rotatably inserted into an internally threaded L-type adjustment fitting for moving the foundation member between first and second positions along the externally threaded rod, and a second end configured as a spherical bearing stud. An internally threaded lock screw and jam nut arrangement restrains angular movement of the foundation member. Mounting flanges fixedly attached to the floor pan of the vehicle comprise a socket for accommodating the spherical bearing stud. A primary toilet seat member is detachably attached to the foundation member and lock hook assemblies are fixedly attached to opposing sides of the foundation member.

14 Claims, 14 Drawing Sheets

(56) References Cited

U.S. PATENT DOCUMENTS

| | | | | |
|---|---|---|---|---|
| 5,720,513 | A * | 2/1998 | Raukauskas | B60N 2/32 297/188.1 |
| 6,488,327 | B1 * | 12/2002 | Pearse | B60N 2/2863 296/37.15 |
| 7,313,833 | B2 * | 1/2008 | Wee | B60R 15/04 4/458 |
| 7,404,499 | B1 * | 7/2008 | Ramsey | B65F 1/062 220/495.06 |
| 9,119,508 | B2 * | 9/2015 | Reed | B62B 9/00 |
| 9,126,548 | B1 * | 9/2015 | Alneaimi | B60R 15/04 |
| 9,365,167 | B1 * | 6/2016 | Lampkin | B60N 2/5833 |
| 9,517,710 | B2 * | 12/2016 | Correia | B60N 2/682 |
| 9,730,563 | B1 * | 8/2017 | Giametta | A47K 13/06 |
| 9,925,932 | B2 * | 3/2018 | Julian | E04H 1/1216 |
| 10,808,414 | B2 * | 10/2020 | McClendon | E04H 1/1216 |
| 2008/0209623 | A1 * | 9/2008 | Schaaf | C05F 3/04 4/449 |
| 2010/0115690 | A1 * | 5/2010 | Wunderlich | B60R 15/04 4/321 |
| 2011/0247132 | A1 * | 10/2011 | Watts | B60R 15/04 4/458 |
| 2014/0157506 | A1 * | 6/2014 | Morris | A47K 11/026 4/483 |

\* cited by examiner

CONCEALED TOILET

BACKGROUND

The apparatus disclosed herein, in general, relates to toilets. More particularly, the apparatus disclosed herein relates to a concealed toilet configured to be mounted on a floorboard in a vehicle.

A frequently encountered problem while traveling in an automotive vehicle such as a car, truck, van or bus for long distances is the need for using the services of a public toilet facility. While traveling, such a facility may not be available at the convenience of the passengers in the vehicle. Also, if the vehicle route chosen passes through sparsely inhabited areas, the probability of finding such a facility is low. Typically, on highways and toll roads, rest stops having stationary toilets are placed at intervals within about 20 to 60 miles or so between each rest stop. In an emergency situation where the passenger needs to use the restroom soon, the advantage of a toilet built into one or more seats of the vehicle is obvious. Moreover, with increasing innovation in the domain of autonomous vehicles, the interior of such vehicles is expected to cater to increased passenger comfort. As such, vehicles of the future may have interiors designed not merely for travel but also for workspaces, entertainment, and the like.

The use of portable toilets is known in the art. However, portable toilets currently in use have complex assemblies and are heavy and bulky which make portable toilets difficult to use and to carry. Moreover, these portable toilets are difficult to position and accommodate in a vehicle due to lack of space in the vehicle. Additionally, installation of such portable toilets is a tedious task requiring, for example, adjusting the size of the cavity in the vehicle to conform to the size of the portable toilet, height adjustment based on user preference, etc. Alternatively, if the user changes his/her vehicle, the entire process of altering various dimensions of the portable toilet to fit the new seat must be redone.

Hence, there is a long felt but unresolved need for a portable toilet, which is convenient to install into a seat of a vehicle irrespective of the type or make of the vehicle. Moreover, there is a need for a portable toilet, which is easily adjustable based on the height requirements of a user.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The apparatus disclosed address the above recited need for a portable toilet, which is convenient to install into a seat of a vehicle irrespective of the type or make of the vehicle. Moreover, the present disclosure addresses the need for a portable toilet, which is easily adjustable based on the height requirements of a user.

In an embodiment of the present disclosure, a concealed toilet in a vehicle seat comprises a flexible container, a foundation member, a support assembly, a primary toilet seat member, lock hook assemblies, and a toilet seat cover. The flexible container is positioned in a cavity in the vehicle seat and accommodates a waste containment bag within a space defined within the flexible container. Several bag fasteners are fixed at predetermined locations on inner surfaces of the flexible container for securing the waste containment bag to the inner surfaces of the flexible container. Moreover, several bag holders extend outwardly from opposing sides of the foundation member for holding an upper portion of the waste containment bag that extend over the opposing sides of the foundation member. An elevated bag diverter extends from an upper surface of the foundation member for diverting the upper portion of the waste containment bag for preventing rupture of the waste containment bag. The foundation member is attached to and protrudes from an upper end of the flexible container for securing the flexible container to the floor pan of the vehicle via a support assembly.

The support assembly is fixedly attached to a lower surface of the foundation member. The support assembly comprises a plurality of first interlocking elements positioned proximal to the lower surface of the foundation member, internally threaded L-type adjustment fittings, externally threaded rods, and mounting flanges. Each of the first interlocking elements are configured to protrude substantially perpendicular relative to the flexible container. Each of the internally threaded L-type adjustment fittings comprises a second interlocking element configured on an upper leg and an internally threaded hole defined in a lower leg of each of the internally threaded L-type adjustment fittings. Each of the externally threaded rods comprises a first end configured to be rotatably inserted into a corresponding one of the internally threaded hole of the internally threaded L-type adjustment fitting. The internally threaded L-type adjustment fitting, when assembled, is positioned below and in contact with the lower surface of the foundation member. The internally threaded L-type adjustment fitting is rotated on the externally threaded rods to move the foundation member between a first position and a second position along each of the externally threaded rods. The internally threaded lock screw and jam nut arrangement is threaded onto the each of the externally threaded rods proximal to the second end such that the internally threaded lock screw and jam nut arrangement is configured to restrain angular movement of the foundation member.

Several mounting flanges are fixedly attached to the floor pan of the vehicle. Each of the mounting flanges comprises a socket configured to accommodate the spherical bearing stud of the second end of a corresponding one of the externally threaded rods. The primary toilet seat member is detachably attached to the upper surface of the foundation member and comprises a tapered guide stud and lock posts. The tapered guide stud extends downwardly from a lower surface of the primary toilet seat member for engaging with a hole defined in the foundation member. The lock posts extend outwardly from opposing sides of the primary toilet seat member. The lock hook assemblies are fixedly attached to the opposing sides of the foundation member. Each of the lock hook assemblies comprises a support structure, a pipe, and a spring accommodated in a space defined within the pipe. The support structure is fixedly attached to a corresponding one of the opposing sides of the foundation member. The pipe is fixedly attached to the support structure. The spring is accommodated in a space defined within the pipe and comprises a lock post hook extending from an upper end of the spring. The lock post hook engages with one of the lock posts of the primary toilet seat member for securing the primary toilet seat member to the foundation member such that a lower end of the spring is connected to the support structure. The toilet seat cover comprises a concealment layer positioned on the primary toilet seat member for concealing the flexible container. A molded hard material is detachably attached to the primary toilet seat member for fitting into the cavity defined in the seat. In an embodiment, the molded hard material is detachably attached to the primary toilet seat member using a pen holder clip and a plurality of spacers. Consequently, by varying the thickness or size of the molded hard material, the concealed toilet can be easily installed to any seat type irrespective of the size of the cavity.

In another embodiment of the present disclosure, in addition to the flexible container, the bag fasteners, the foundation member, the support assembly, the primary toilet seat member, and the lock hook assemblies, the concealed toilet further comprises a secondary toilet seat member that can be used by a child user. The secondary toilet seat member is, for example, made of plastics, metal, composites, etc. The secondary toilet seat member can be carried in a separate carrying bag and positioned in the primary toilet seat member of the concealed toilet, when needed by the child user. The secondary toilet seat member comprises a base plate and a sleeve. The base plate of the secondary toilet seat member comprises about a 45° tapered outer periphery that securely fits within about a 45° tapered inner periphery of the primary toilet seat member. The sleeve of the secondary toilet seat member extends upwardly from an upper surface of the base plate for receiving sanitary waste from the child user. The sleeve of the secondary toilet seat member comprises a rim defining an opening for receiving the sanitary waste from the child user. The child user may sit on the rim of the sleeve of the secondary toilet seat member for toilet use. In an embodiment, a lining is disposed on the inner surfaces of the opening of the sleeve for sanitation purposes.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF THE INVENTION

Figure 1:
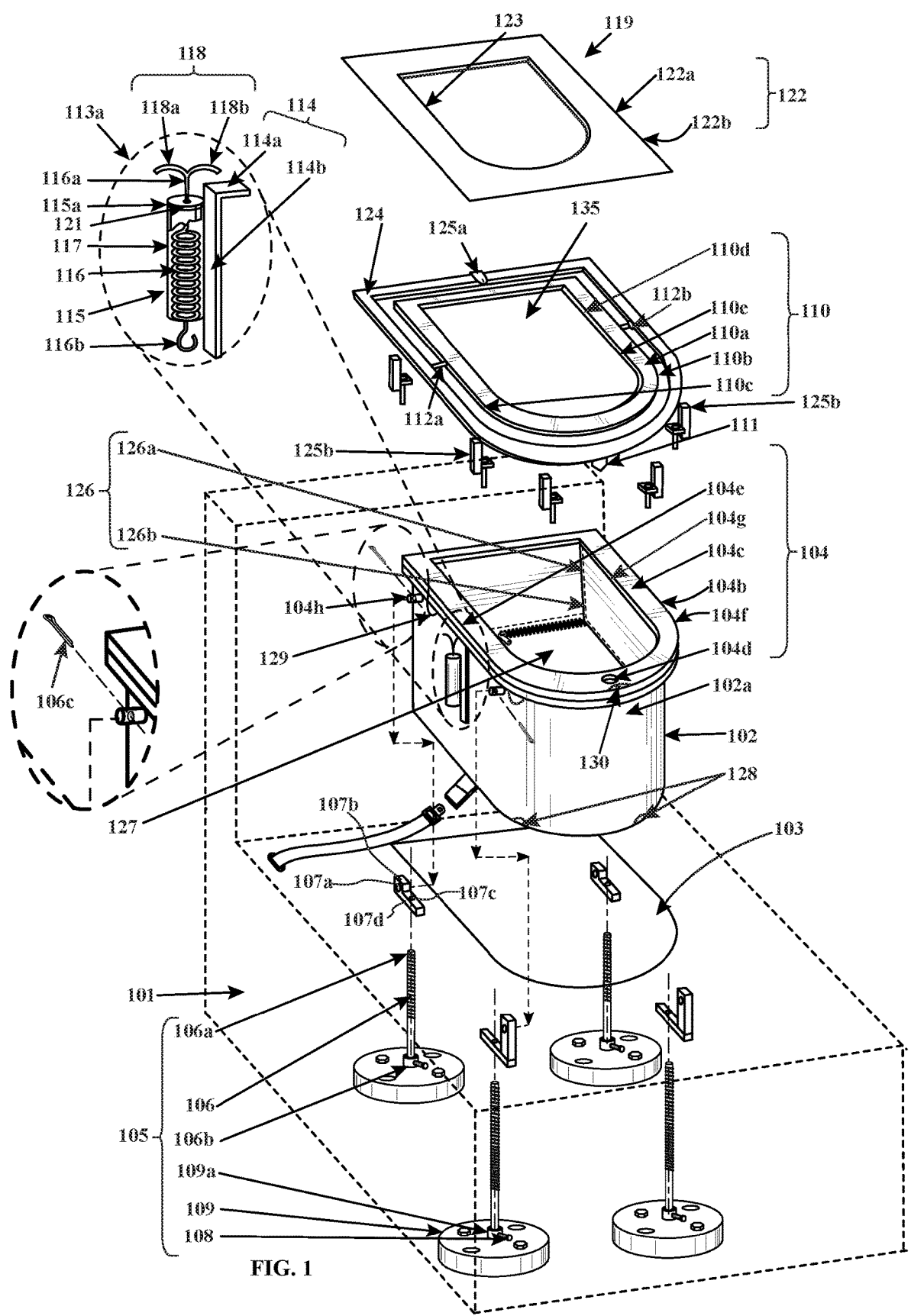
FIG. 1 exemplarily illustrates an exploded elevation view of a concealed toilet configured to be mounted on a floor pan of a vehicle.
Figure 2:
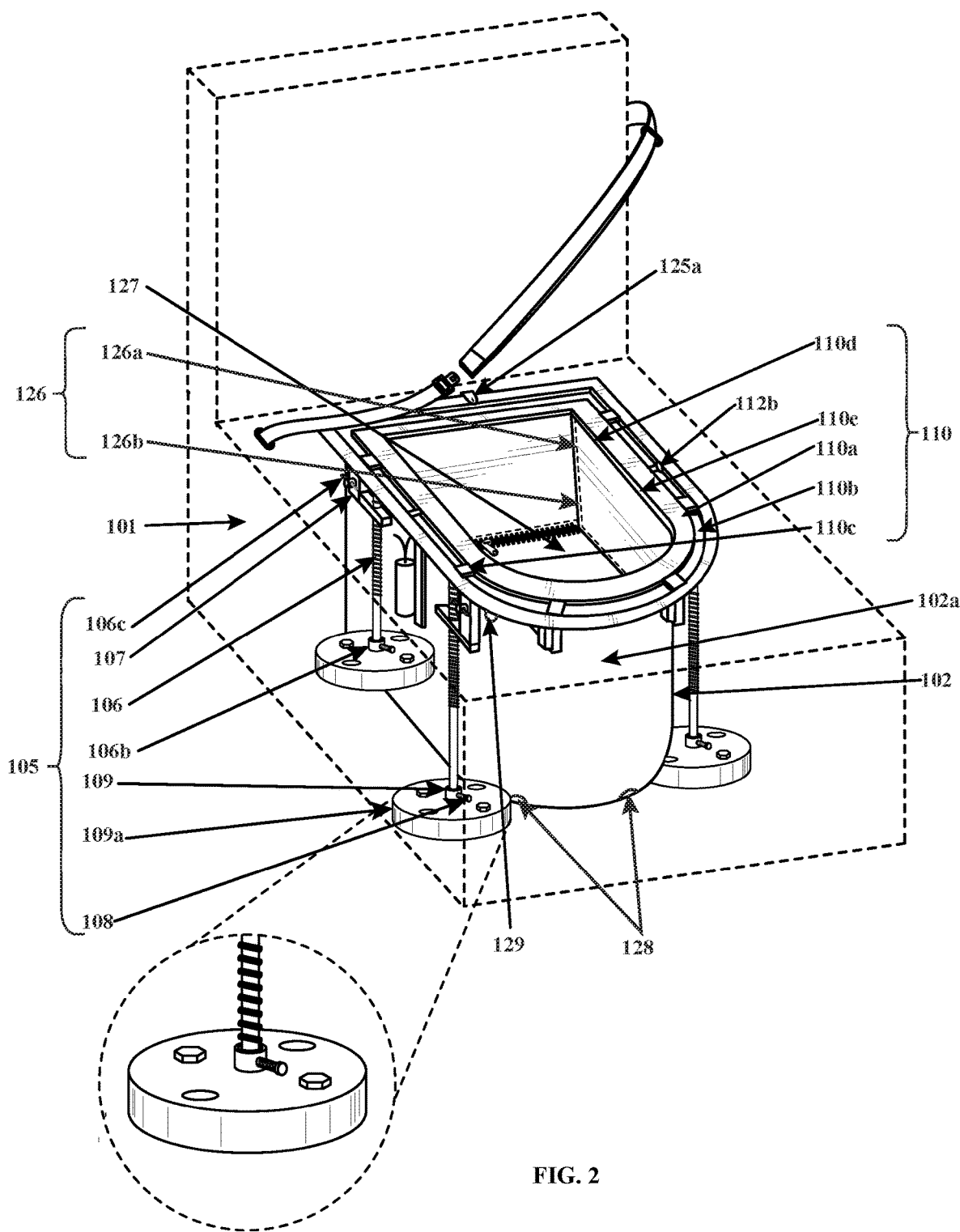
FIG. 2 exemplarily illustrates an assembled view of the concealed toilet shown in FIG. 1.

FIG. 1 exemplarily illustrates an exploded elevation view of a concealed toilet 100 configured to be mounted on a floor pan of a vehicle. FIG. 2 exemplarily illustrates an assembled view of the concealed toilet 100 shown in FIG. 1. The concealed toilet 100 in a vehicle seat 101 comprises a flexible container 102, a foundation member 104, a support assembly 105, a primary toilet seat member 110, lock hook assemblies 113a and 113b, and a toilet seat cover 119 as exemplarily illustrated in FIGS. 1-2.

Figure 13:
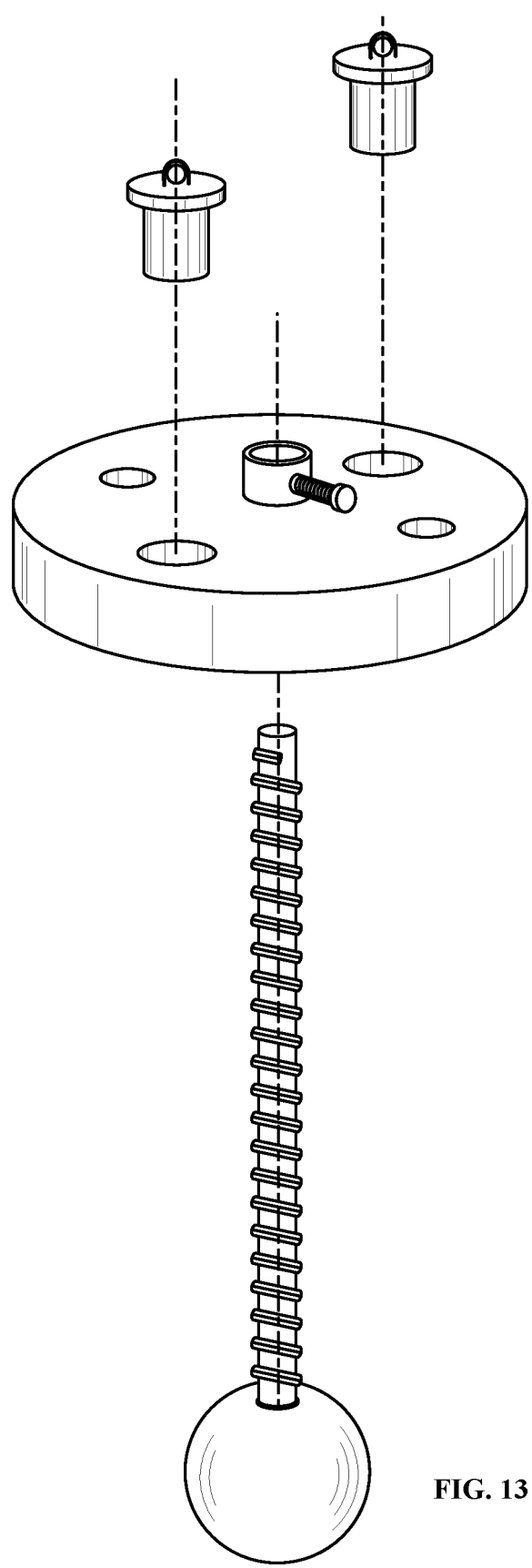
FIG. 13 exemplarily illustrates an exploded view of a portion of the embodiment of the support assembly of the concealed toilet illustrated in FIG. 12.
Figure 14:
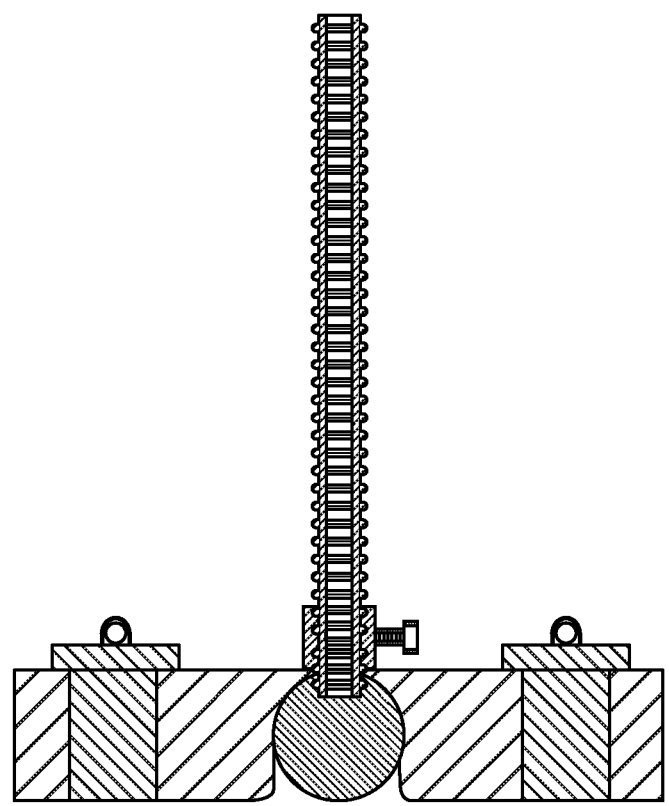
FIG. 14 exemplarily illustrates a cross-sectional view of a portion of the embodiment of the support assembly of the concealed toilet illustrated in FIG. 12.

The flexible container 102 is positioned in a cavity 103 in the vehicle seat 101 and accommodates a waste containment bag 126 within a space 127 defined within the flexible container 102. Several bag fasteners 128 are fixed at predetermined locations on inner surfaces of the flexible container 102 for securing a lower portion 126b of the waste containment bag 126 to the inner surfaces of the flexible container 102 within the space 127 of the flexible container 102. Several bag holders 129 extend outwardly from opposing sides of the foundation member 104 for securing an upper portion 126a of the waste containment bag 126 that extends over the opposing sides (104e, 104f) of the foundation member 104. An elevated bag diverter 130 extends from an upper surface 104c of the foundation member 104 for diverting the upper portion 126a of the waste containment bag 126 for preventing rupture of the waste containment bag 126. The foundation member 104 is attached to and protrudes from an upper end 102a of the flexible container 102 for securing the flexible container 102 to the floor pan of the vehicle via a support assembly 105. The support assembly 105 is fixedly attached to a lower surface 104b of the foundation member 104. The support assembly 105 comprises a plurality of first interlocking elements 104a positioned proximal to the lower surface 104b of the foundation member 104, internally threaded L-type adjustment fittings 107, externally threaded rods 106, and mounting flanges 109. In an embodiment, each of the first interlocking elements 104a is configured to protrude substantially perpendicular relative to the flexible container 102. The first interlocking elements 104a are mounted on a vertical structural projection that extends from below the foundation member 104. Each of the internally threaded L-type adjustment fittings 107 comprises a second interlocking element 107a configured on an upper leg 107b and an internally threaded hole 107c defined in a lower leg 107d of each of the internally threaded L-type adjustment fittings 107. Each of the externally threaded rods 106 comprise a first end 106a configured to be rotatably inserted into a corresponding one of the internally threaded hole 107c of the internally threaded L-type adjustment fitting 107. Once inserted, a cotter pin 106c is inserted into a hole defined in each of the first interlocking elements 104a to prevent disengagement of the internally threaded L-type adjustment fittings 107 from the first interlocking element 104a. When assembled, the internally threaded L-type adjustment fitting 107 is positioned below and in contact with the lower surface 104b of the foundation member 104. The internally threaded L-type adjustment fitting 107 is rotated on the externally threaded rods 106 to move the foundation member 104 between a first position and a second position along each of the externally threaded rods 106. This structure of the concealed toilet 100 allows a user to adjust the height of the concealed toilet based on user preference by selecting a longer or shorter externally threaded rod 106. A second end 106b of the externally threaded rods is configured as a spherical bearing stud 106d, as illustrated in FIGS. 13 and 14. The internally threaded lock screw and jam nut arrangement 108 is threaded onto the each of the externally threaded rods 106 proximal to the second end 106b. The internally threaded lock screw and jam nut arrangement 108 is configured to restrain angular movement of the foundation member 104. The mounting flanges 109 are fixedly attached to the floor pan of the vehicle. Each of the mounting flanges 109 comprise a socket 109a configured to accommodate the spherical bearing stud 106d of the second end 106b of a corresponding one of the externally threaded rods 106. The entire support assembly 105 is accessed through a zip fastener provided in a space 127 defined in the flexible container 102. The second end 106b of the externally threaded rods 106 is configured as a spherical bearing stud 106d having a diameter ranging from about 0.3-0.4 inches.

The mounting flanges 109 are fixedly attached to the floor pan of the vehicle such that each of the mounting flanges 109 comprise a socket 109a configured to accommodate the spherical bearing stud 106d of the second end 106b of a corresponding one of the externally threaded rods 106. In an embodiment, the mounting flanges 109 are of a cylindrical geometrical configuration or a cuboidal geometrical configuration. The mounting flanges 109 are attached to the floor pan of the vehicle using magnets or fasteners such as screw thread fasteners, nut and bolt fasteners, etc. The primary toilet seat member 110 is detachably attached to the upper surface 104c of the foundation member 104. A molded hard material 124 is detachably attached to the primary toilet seat member 110 for fitting into the cavity 103 defined in the vehicle seat 101. In an embodiment, the molded hard material 124 is detachably attached to the primary toilet seat member 110 using a pen holder clip 125a and a plurality of spacers 125b as described in the detailed description of FIG. 3. The molded hard material 124 is made 0.75 inch larger than the outline of the primary toilet seat member 110 such that a space is defined between the molded hard material 124 and the primary toilet seat member 110. Consequently, by varying the thickness or size of the molded hard material 124, the concealed toilet 100 can be easily installed to any seat type irrespective of the size of the cavity 103.

The primary toilet seat member 110 is detachably attached to the upper surface 104c of the foundation member 104. The primary toilet seat member 110 comprises a tapered guide stud 111 and lock posts 112a and 112b. The tapered guide stud 111 is a fastening element that extends downwardly from a lower surface 110a of the primary toilet seat member 110. The length of the tapered guide stud 111 is, for example, about 0.375 inches. The diameter of the tapered guide stud 111 is, for example, about 0.25 inches. The tapered guide stud 111 engages with a hole 104d defined in the foundation member 104 as exemplarily illustrated in FIG. 1. The lock posts 112a and 112b extend outwardly from opposing sides 110b and 110c of the primary toilet seat member 110 respectively. In an embodiment, the lock posts 112a and 112b are cylindrical projections each with enlarged circular ends, as exemplarily illustrated in FIG. 1. In another embodiment, the lock posts 112a and 112b comprise enlarged ends of any other geometrical shape, for example, a square shape, a triangular shape, etc. The length of each of the lock posts 112a and 112b is, for example, about 0.25 inches. The thickness of each of the lock posts 112a and 112b is, for example, about 0.125 inches. The diameter of each of the enlarged circular ends of the lock posts 112a and 112b is, for example, about 0.0625 inches. The length of the lock posts 112a and 112b is configured to maintain a pressure exerted by springs 116 in the lock hook assemblies 113a and 113b on the primary toilet seat member 110.

The primary toilet seat member 110 further comprises a tapered inner periphery 110d angled, for example, at about 45° with respect to an upper surface 110e of the primary toilet seat member 110. The tapered inner periphery 110d of the primary toilet seat member 110 engages with the about 45° tapered inner periphery 104g of the foundation member 104. The thicknesses of the primary toilet seat member 110 and the about 45° tapered inner periphery 110d of the primary toilet seat member 110 are, for example, about 0.5 inches and 0.25 inches respectively. The tapered inner periphery 110d of the primary toilet seat member 110 further matches with a tapered member 123 of the toilet seat cover 119 exemplarily illustrated in FIG. 1, for receiving and mating with the tapered member 123 of the toilet seat cover 119. The primary toilet seat member 110 is made of, for example, plastic, composites, metal, etc.

The lock hook assemblies 113a and 113b are fixedly attached to the opposing sides 104e and 104f of the foundation member 104 respectively, as exemplarily illustrated in FIG. 1, for example, using screws, bolts, rivets, etc. In an embodiment, the lock hook assemblies 113a and 113b are molded together with the foundation member 104. Each of the lock hook assemblies 113a and 113b comprise a support structure 114, a pipe 115, and a spring 116. An enlarged cutaway view of one lock hook assembly 113a showing the support structure 114, the pipe 115, and the spring 116 is exemplarily illustrated in FIG. 1. Similar to the lock hook assembly 113a fixedly attached to one opposing side 104e of the foundation member 104, the lock hook assembly 113b comprising a corresponding support structure 114, pipe 115 and spring 116 is fixedly attached to the other opposing side 104f of the foundation member 104. The support structure 114 is fixedly attached to the opposing side 104e of the foundation member 104. In an embodiment, the support structure 114 is a 90° angle bracket or an L bracket glued, or welded, or fixed using screws, bolts, rivets, etc., to the opposing side 104e of the foundation member 104.

As exemplarily illustrated in the enlarged cutaway view of FIG. 1, the support structure 114 of the lock hook assembly 113a comprises a short arm 114a and a long arm 114b perpendicular to each other. The short arm 114a of the support structure 114 is fixed to the lower surface 104b of the foundation member 104, for example, using screws, bolts, rivets, etc. In an embodiment, the short arm 114a of the support structure 114 is welded to the lower surface 104b of the foundation member 104. The support structure 114 supports the pipe 115 and the spring 116 against the foundation member 104. The support structure 114 is, for example, made from metal, plastic, composites, etc. The pipe 115 of the lock hook assembly 113a is fixedly attached to the long arm 114b of the support structure 114. In an embodiment, the pipe 115 and the support structure 114 of the lock hook assembly 113a are molded together and attached to the foundation member 104. In another embodiment, the pipe 115 is welded to the long arm 114b of the support structure 114. The pipe 115 is a hollow metal pipe with a space 117 defined within the pipe 115. The diameter of the pipe 115 is, for example, about 0.25 inches. The pipe 115 is, for example, made of metal, plastic, composites, etc.

The spring 116 of the lock hook assembly 113a is accommodated in the space 117 defined within the pipe 115. The spring 116 is a wire, for example, made of steel, alloy steel, metal composites, etc. The spring 116 comprises at least two hooks 118 extending from an upper end 116a of the spring 116 as exemplarily illustrated in FIG. 1. The hooks 118 are welded to the upper end 116a of the spring 116. In an embodiment, the hooks 118 are soldered to the upper end 116a of the spring 116. The hooks 118 comprise a lock post hook 118a extending from the upper end 116a of the spring 116. The lock post hook 118a of each of the lock hook assemblies 113a and 113b engages with each of the lock posts 112a and 112b of the primary toilet seat member 110 respectively, for securing the primary toilet seat member 110 to the foundation member 104. The hooks 118 further comprise a finger hook 118b extending from the upper end 116a of the spring 116. The finger hook 118b facilitates engagement of the lock post hook 118a with the lock post 112a of the primary toilet seat member 110. Similarly, the finger hook 118b of the lock hook assembly 113b facilitates engagement of the lock post hook 118a with the lock post 112b of the primary toilet seat member 110. In an embodiment, the hooks 118 are made of substantially the same material as the spring 116. The hooks 118 are, for example, made of steel, alloy steel, metal composites, etc.

A lower end 116b of the spring 116 is connected to the support structure 114 of the lock hook assembly 113a, for example, using a ring element 120 attached to the long arm 114b of the support structure 114 as exemplarily illustrated in FIG. 1. The lower end 114b of the spring 116 is bent and hooked into the ring element 120 extending from the long arm 114b of the support structure 114. The ring element 120 is fixed to the long arm 114b of the support structure 114, for example, about 0.5 inches below a lower end of the pipe 115. In an embodiment, the ring element 120 is made of substantially the same material as the spring 116. The ring element 120 is, for example, made of steel, alloy steel, metal composites, etc. In an embodiment, the lower end 116b of the spring 116 is directly fixed to the long arm 114b of the support structure 114. In another embodiment, the lower end 116b of the spring 116 is soldered to the long arm 114b of the support structure 114.

Each of the lock hook assemblies 113a and 113b further comprises a spring stop 121 positioned on an upper end 115a of the pipe 115 for precluding the spring 116 from extending outwards from the pipe 115. The spring stop 121 resists tension developed in the spring 116 when the spring 116 is pulled by the finger hook 118b to facilitate locking of the foundation member 104 to the lock post 112a of the primary toilet seat member 110 using the lock post hook 118a. Similarly, the spring stop 121 of the lock hook assembly 113b resists tension developed in the spring 116 of the lock hook assembly 113b when the spring 116 is pulled by the finger hook 118b to facilitate locking of the foundation member 104 to the lock post 112b of the primary toilet seat member 110 using the lock post hook 118a of the lock hook assembly 113b. In an embodiment, a clearance of 0.0625 inches is provided between the foundation member 104 and the pipe 115 of each of the lock hook assemblies 113a and 113b.

The toilet seat cover 119 comprises a concealment layer 122 positioned on the primary toilet seat member 110 for concealing a space 127 defined in the flexible container 102. The concealment layer 122 comprises an upper surface 122a and a lower surface 122b. In an embodiment, the upper surface 122a of the concealment layer 122 of the toilet seat cover 119 is a cushioned surface. As exemplarily illustrated in FIG. 1, the toilet seat cover 119 further comprises a tapered member 123 extending downwardly from a lower surface 122b of the concealment layer 122 to mate and engage with the about 45° angled tapered inner periphery 110d of the primary toilet seat member 110. The tapered member 123 of the toilet seat cover 119 extends, for example, about 0.25 inches from the concealment layer 122 to about 0.5 inches in a downward direction and fits into the opening 135 of the primary toilet seat member 110 for sealing the primary toilet seat member 110. The thickness of the concealment layer 122 is, for example, about 0.0625 inches and the thickness of the tapered member 123 is, for example, about 0.75 inches. The tapered inner periphery 110d of the primary toilet seat member 110 matches the tapered member 123 of the toilet seat cover 119 to allow the toilet seat cover 119 to be positioned and engage with the primary toilet seat member 110. The 0.25-inch taper of the toilet seat cover 119 mates with the 0.25-inch taper in the primary toilet seat member 110 for engaging the toilet seat cover 119 into the primary toilet seat member 110. The additional 0.5-inch extension of the tapered member 123 of the toilet seat cover 119 matches the offset in the primary toilet seat member 110. In an embodiment, the material of the concealment layer 122 is substantially the same as that of the vehicle seat 101. In another embodiment, the material of the concealment layer 122 is different from the vehicle seat 101. The concealment layer 122 is, for example, made of polyester, nylon, leather, rubber such as neoprene, vinyl, canvas, suede, etc.

Figure 3:
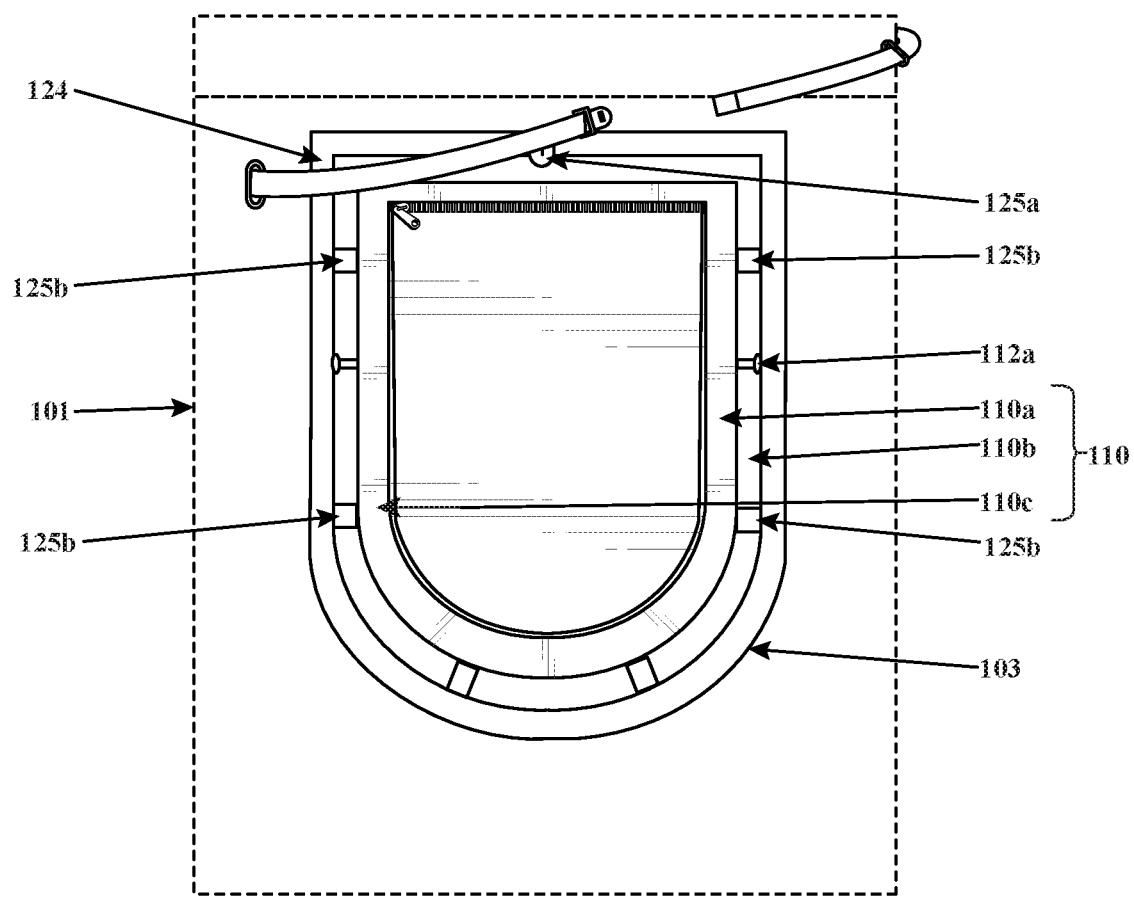
FIG. 3 exemplarily illustrates a top plan view of the concealed toilet.
Figure 4:
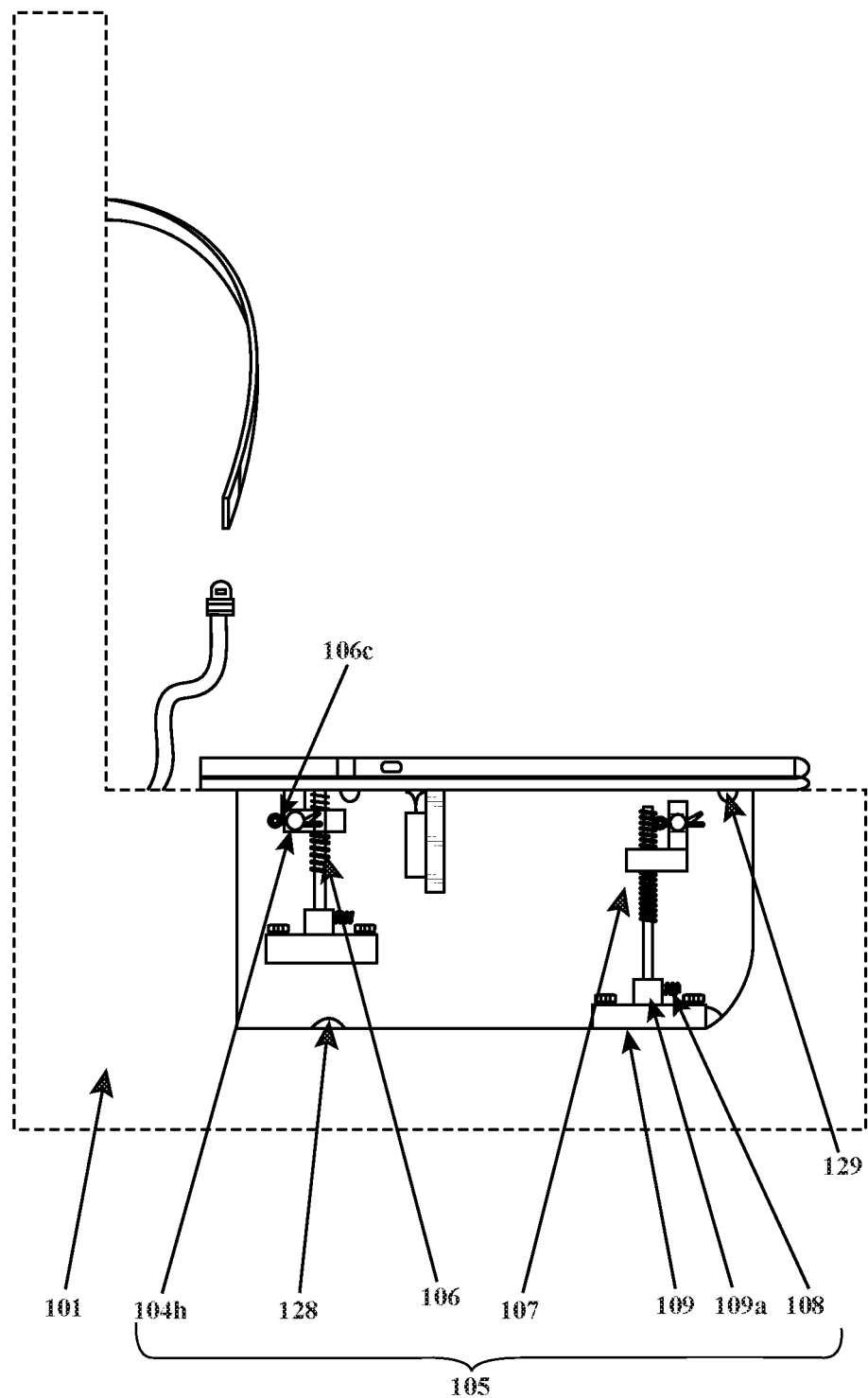
FIG. 4 exemplarily illustrates a right-side view of the concealed toilet.
Figure 5:
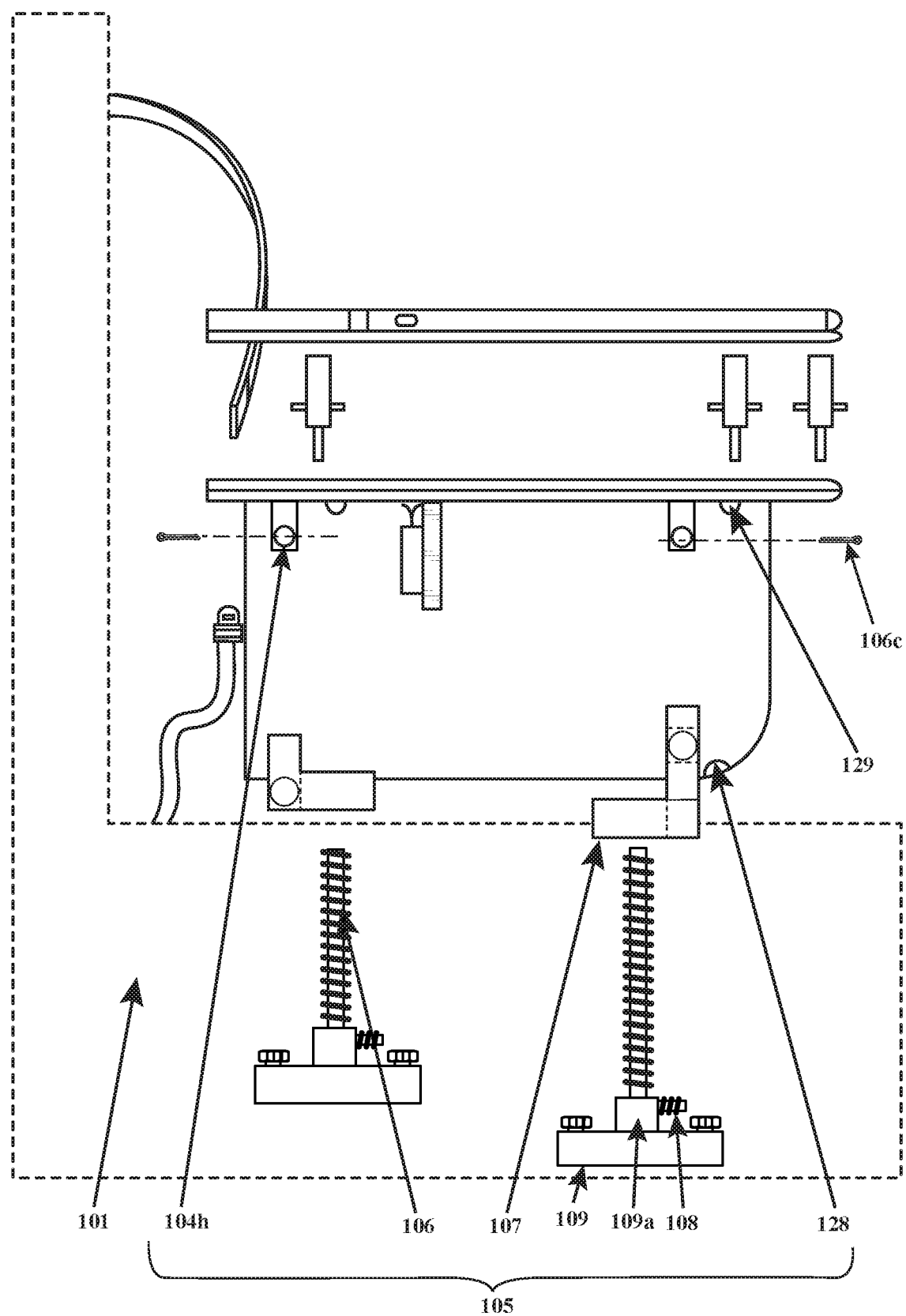
FIG. 5 exemplarily illustrates an exploded right-side view of the concealed toilet.

FIG. 3 exemplarily illustrates a top plan view of the concealed toilet 100. The foundation member 104 is attached to the upper end 102a of the flexible container 102 as exemplarily illustrated in FIGS. 1-2. In an embodiment, the foundation member 104 is fixed to the flexible container 102, for example, using screws, bolts, rivets, etc. In another embodiment, the foundation member 104 is welded to the flexible container 102. A molded hard material 124 is detachably attached to the primary toilet seat member 110 for fitting into the cavity 103 defined in the vehicle seat 101. In an embodiment, the molded hard material 124 is detachably attached to the primary toilet seat member 110 using a pen holder clip 125a at a rear end of the concealed toilet 100. The molded hard material 124 is about 0.25 inches thick with a about 1-inch×0.03125-inch 90-degree ledge fabricated about 0.75 inch larger than the primary toilet seat member 110. The molded hard material 124 is made about 0.75 inch larger than the outline of the primary toilet seat member 110 such that a space is defined between the molded hard material 124 and the primary toilet seat member 110. In an embodiment, about six 0.75-inch-thick spacers 125b are provided in the about 0.75-inch void between the primary toilet seat member 110 and the molded hard material 124. The spacers 125b allow easy access for engaging the support assembly 105 exemplarily illustrated in FIG. 4. Furthermore, the spacers 125b prevent lateral movement of the concealed toilet 100 thereby improving the stability of the entire assembly. In an embodiment, the spacers 125b are detachably attached to the primary toilet seat member 110 with a fastener, for example a screw, etc. The provision of the molded hard material 124 fills the cavity 103 defined in the vehicle seat 101 irrespective of the design or make of the vehicle FIG. 4 exemplarily illustrates a right-side view of the concealed toilet 100. FIG. 5 exemplarily illustrates an exploded right-side view of the concealed toilet 100. The support assembly 105 is fixedly attached to a lower surface 104b of the foundation member 104 exemplarily illustrated in FIG. 1. As disclosed in the detailed description of FIGS. 1-2, the support assembly 105 comprises a plurality of first interlocking elements 104a positioned proximal the lower surface 104b of the foundation member 104, internally threaded L-type adjustment fittings 107, externally threaded rods 106, and mounting flanges 109. Moreover, several bag holders 129 extend outwardly from opposing sides of the foundation member 104 for holding an upper portion 126a of the waste containment bag 126 as disclosed in the detailed description of FIGS. 1-2. In an embodiment, each of the first interlocking elements 104a is configured to protrude substantially perpendicular relative to the flexible container 102, as exemplarily illustrated in FIGS. 1-2. Moreover, the first interlocking elements 104a are mounted on a vertical structural projection that extends from underneath the foundation member 104. Although the first interlocking elements 104a protrude perpendicularly relative to the flexible container 102, it will be appreciated that the first interlocking elements 104a can be oriented at different angles relative to the flexible container 102. In an embodiment, the first interlocking element 104a is a male connecting member that is configured to mate with a female connecting member configured as the second interlocking element 107a on an upper leg 107b of the internally threaded L-type adjustment fittings 107 as exemplarily illustrated in FIG. 1. Each of the internally threaded L-type adjustment fittings 107 additionally comprises an internally threaded hole 107c defined in a lower leg 107d of each of the internally threaded L-type adjustment fittings 107. A first end 106a of one of the externally threaded rods 106 is rotatably inserted into a corresponding one of the internally threaded hole 107c of the internally threaded L-type adjustment fitting 107. Once the first end 106a of the externally threaded rods 106 is inserted, a cotter pin 106c is inserted into a hole defined in each of the first interlocking elements 104a to prevent disengagement of the internally threaded L-type adjustment fittings 107 from the first interlocking element 104a. Due to the shortage of space towards the rear portion of the seat cavity 103, the length of the externally threaded rods 106 at the rear of the concealed toilet 100 are shorter than the externally threaded rods 106 at the front end. Thus, the length of the externally threaded rods 106 are selected based on the height and slope requirements of the seat cavity 103. This feature allows a user to install the concealed toilet 100 in the seat cavity 103 of any type of vehicle cost effectively. Moreover, this structure of the concealed toilet 100 allows an operator to install the concealed toilet at a suitable height based on user preference by selecting a longer or shorter externally threaded rod 106. The second end 106b of the externally threaded rods is configured as a spherical bearing stud 106d. An internally threaded lock screw and jam nut arrangement 108 is threaded onto the each of the externally threaded rods 106 proximal to the second end 106b such that the internally threaded lock screw and jam nut arrangement 108 restrains angular movement of the foundation member 104. The mounting flanges 109 are fixedly attached to the floor pan of the vehicle as disclosed in the detailed description of FIGS. 1-2.

Figure 6:
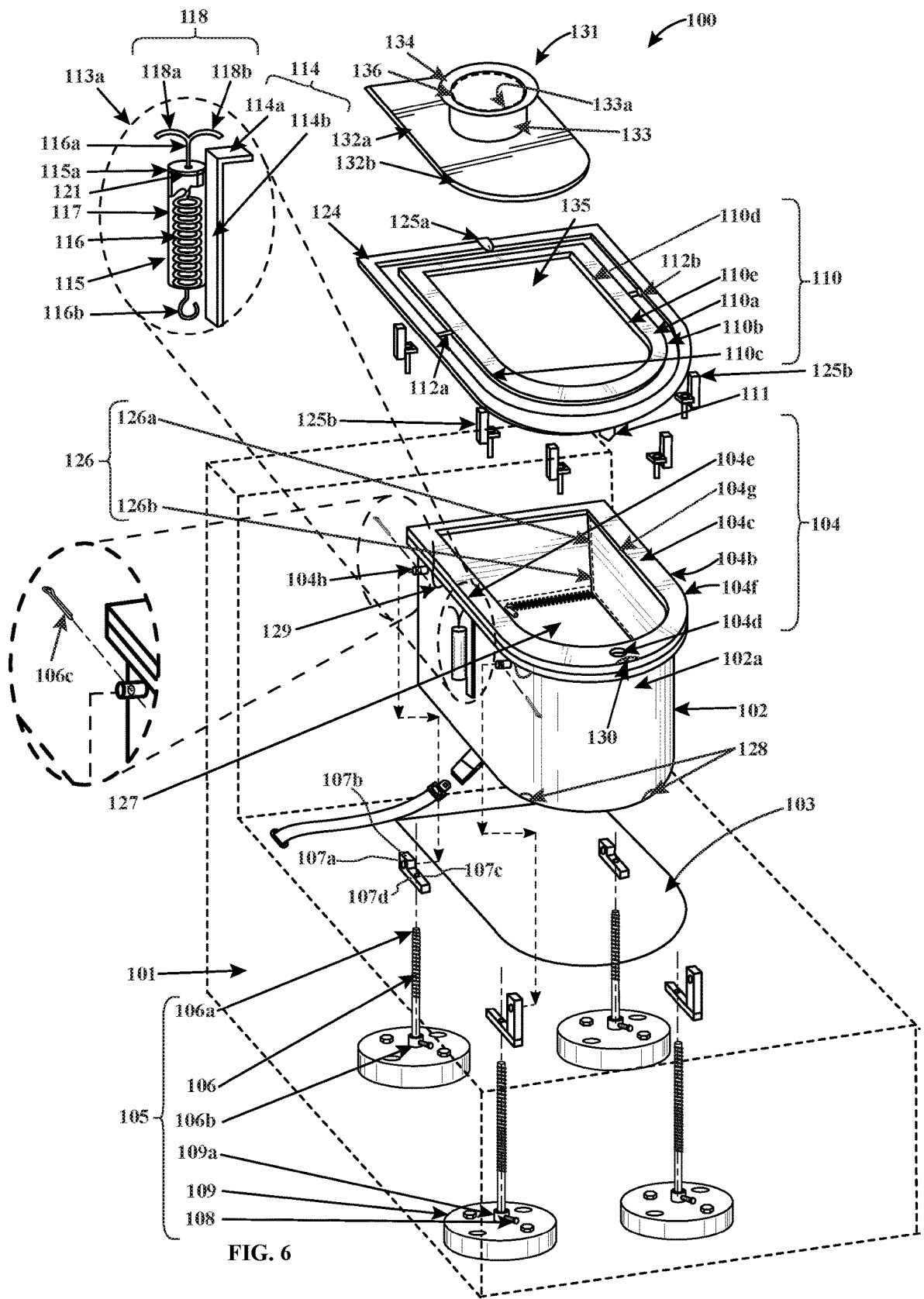
FIG. 6 exemplarily illustrates an exploded elevation view of a concealed toilet configured to be mounted on a floor pan of a vehicle.
Figure 7:
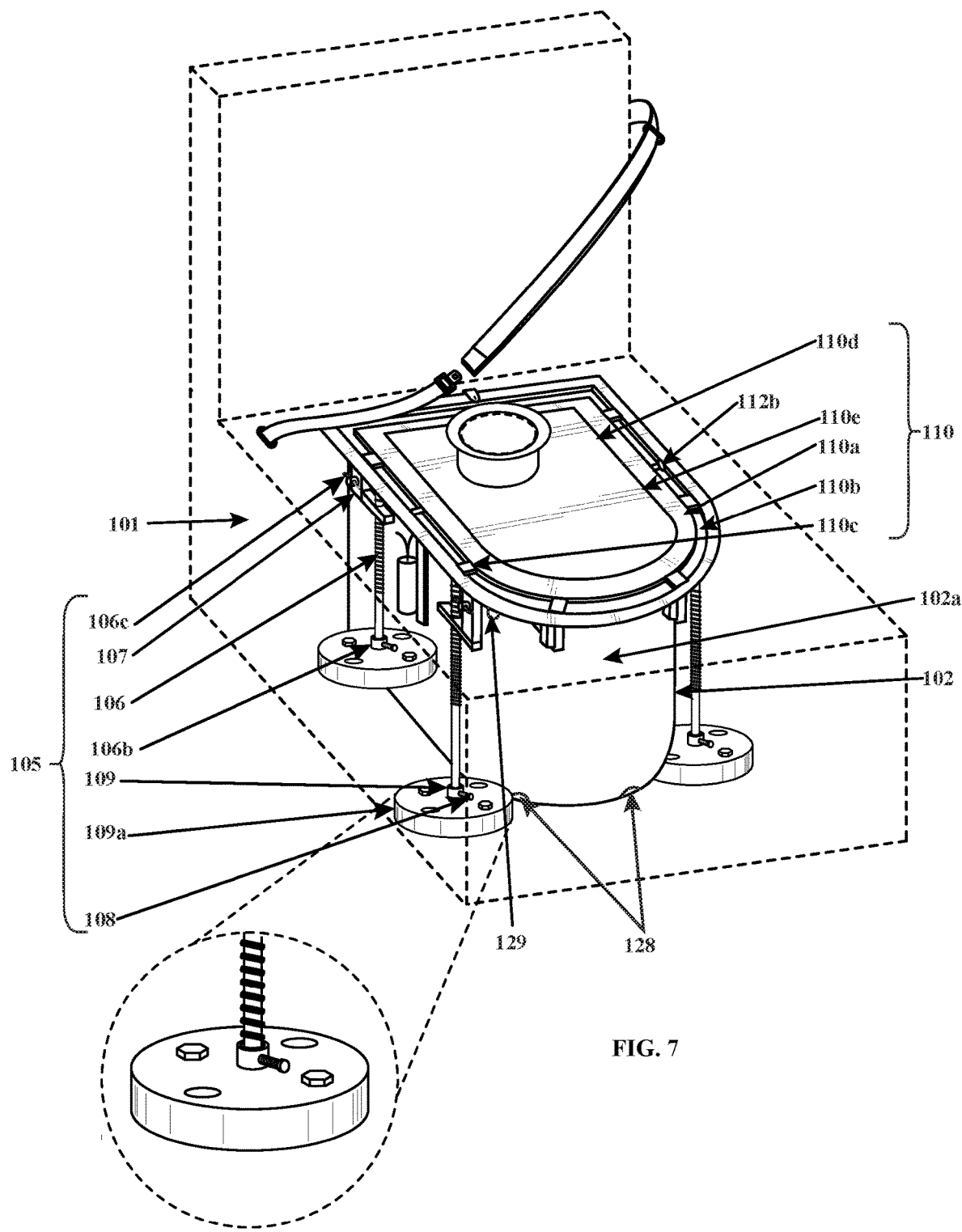
FIG. 7 exemplarily illustrates an assembled view of the concealed toilet shown in FIG. 1.

FIG. 6 exemplarily illustrates an exploded elevation view of an embodiment of the concealed toilet configured to be mounted on a floor pan of a vehicle. FIG. 7 exemplarily illustrates an assembled view of the concealed toilet shown in FIG. 6. In this embodiment, in addition to the flexible container 102, the bag fasteners 128, the foundation member 104, the primary toilet seat member 110, and the lock hook assemblies 113a and 113b, the concealed toilet 100 further comprises the secondary toilet seat member 131 that can be used by a child user. The secondary toilet seat member 131 is, for example, made of plastics, metal, composites, etc. The secondary toilet seat member 131 can be carried in a separate carrying bag and positioned in the primary toilet seat member 110 of the concealed toilet 100, when needed by the child user. The secondary toilet seat member 131 comprises a base plate 132 and a sleeve 133. The base plate 132 of the secondary toilet seat member 131 comprises about a 45° tapered outer periphery 132b that securely fits within the about 45° tapered inner periphery 110d of the primary toilet seat member 110. The thickness of the about 45° tapered outer periphery 132b of the base plate 132 is, for example, about 0.25 inches. The overall thickness of the base plate 132 along with the about 45° tapered outer periphery 132b is, for example, about 0.75 inches. The sleeve 133 of the secondary toilet seat member 131 extends upwardly from an upper surface 132a of the base plate 132 for receiving sanitary waste from the child user. The sleeve 133 of the secondary toilet seat member 131 comprises a rim 134 defining an opening 135 for receiving the sanitary waste from the child user. The child user may sit on the rim 134 of the sleeve 133 of the secondary toilet seat member 131 for toilet use. In an embodiment, a lining 136 is positioned on inner surfaces 133a of the opening 135 of the sleeve 133 for sanitation purposes. The lining 136 in the sleeve 133 extends in a downward direction into the waste containment bag 126 positioned in the flexible container 102. The lining 136 in the sleeve 133 of the secondary toilet seat member 131 is indicated using dashed lines in FIG. 6. The waste containment bag 126 is indicated using dashed lines in FIGS. 1 and 6. In an embodiment, the lining 136 is replaced with a sheet made of, for example, polythene, a synthetic material, etc. The lining 136 is made of stretchable materials, for example, rubber, polythene, plastic, etc., with increased elasticity. The opening 135 of the sleeve 133 is in fluid communication with the waste containment bag 126 in the space 127 defined within the flexible container 102 for transferring the sanitary waste from the child user to the waste containment bag 126.

The assembly of the foundation member 104 along with flexible container 102 and the detachable attachment of the primary toilet seat member 110 to the foundation member 104 are disclosed in the detailed description of FIGS. 1-2. In this embodiment, the toilet seat cover 119 with the concealment layer 122 exemplarily illustrated in FIGS. 1-2, is removed from the upper surface of the vehicle seat 101 to expose the primary toilet seat member 110 concealed by the toilet seat cover 119 and to allow positioning of the secondary toilet seat member 131 in the primary toilet seat member 110 for use by a child user. The tapered inner periphery 110c of the primary toilet seat member 110, receives and mates with the tapered outer periphery 132b of the base plate 132 of the secondary toilet seat member 131. The tapered inner periphery 110c of the primary toilet seat member 110 matches with the tapered outer periphery 132b of the base plate 132 of the secondary toilet seat member 131 to allow the secondary toilet seat member 131 to be positioned and to fit into the primary toilet seat member 110. The about 0.25-inch taper of the secondary toilet seat member 131 mates with the about 0.25-inch taper in the primary toilet seat member 110 for fitting the secondary toilet seat member 131 into the primary toilet seat member 110. The additional about 0.5-inch extension of the tapered outer periphery 132b of the base plate 132 of the secondary toilet seat member 131 matches the offset in the primary toilet seat member 110. In an embodiment, accessories for use with the concealed toilet 100, for example, a closable handheld urinal, toilet tissues, and additional waste containment bags 126 can be carried within a carrying bag that contains the secondary toilet seat member 131. A space (not shown) may be provided between the concealed toilet 100 and the vehicle seat 101 in the vehicle (not shown) to accommodate the used waste containment bag 126 to carry the waste containment bag 126 to a disposal site. In an embodiment, a clean shield (not shown) that conforms to the vehicle seat 101 is positioned behind the concealed toilet 100. The clean shield is in the form of an "L" shape. The clean shield is, for example, a plastic sheet that is provided in the vehicle for sanitary and hygienic purposes. The height of the clean shield is, for example, about 6 inches and the width of the clean shield is substantially the same as that of the primary toilet seat member 110. The concealed toilet 100 disclosed herein is configured to adapt to multiple seats in the vehicle, for example, a front seat, a rear seat, etc. The concealed toilet 100 can be used by persons of all ages with different physical attributes. Furthermore, the concealed toilet 100 is adaptable to any standard size seat on any means of transportation with a few alterations.

Figure 8:
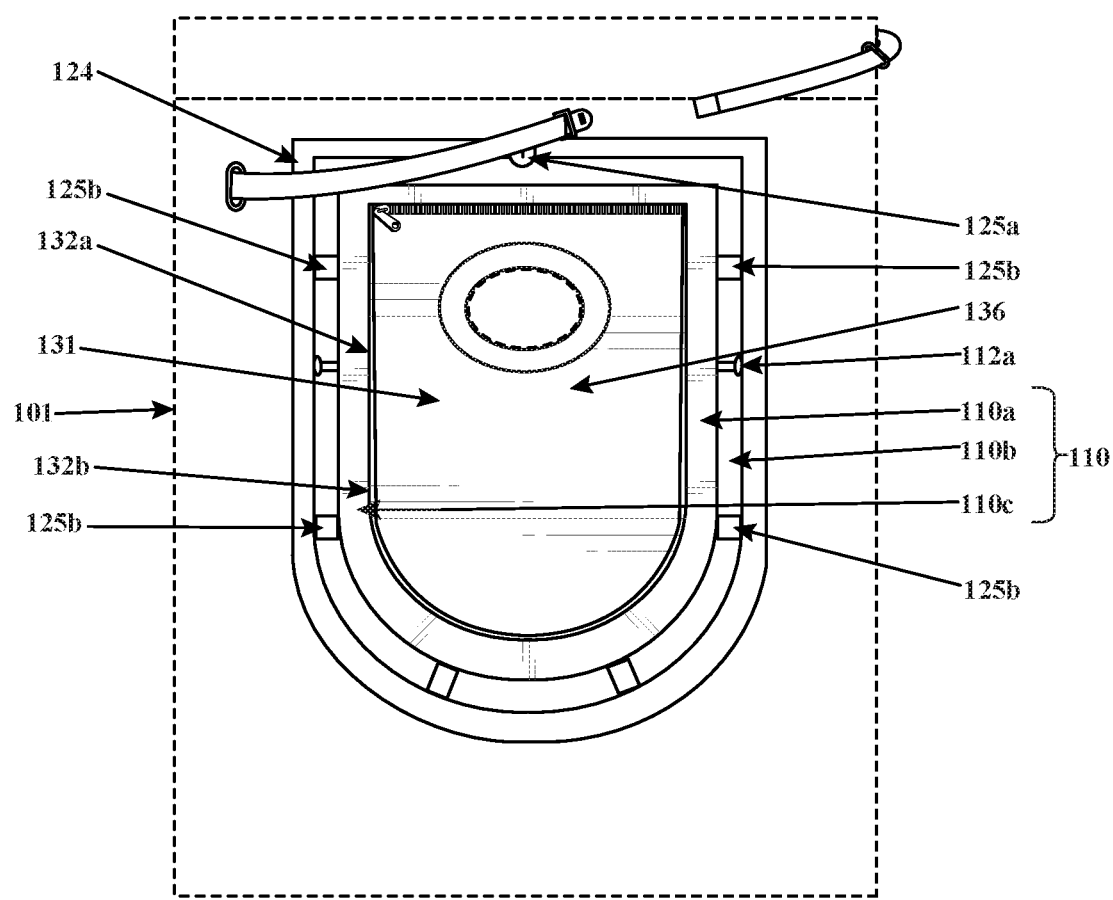
FIG. 8 exemplarily illustrates a top plan view of the concealed toilet.

FIG. 8 exemplarily illustrates a top plan view of the concealed toilet 100 positioned within a vehicle seat 101. In an embodiment, the upper surface 132a of the base plate 132 of the secondary toilet seat member 131 is a cushioned surface. The lining 136 is provided in the sleeve 133 of the secondary toilet seat member 131 for sanitary and hygienic purposes and extends into the waste containment bag 126 in the flexible container 102 exemplarily illustrated in FIG. 6. The molded hard material 124 is detachably attached to the primary toilet seat member 110 using a pen holder clip 125a and a plurality of spacers 125b as disclosed in the detailed description of FIG. 3.

Figure 9:
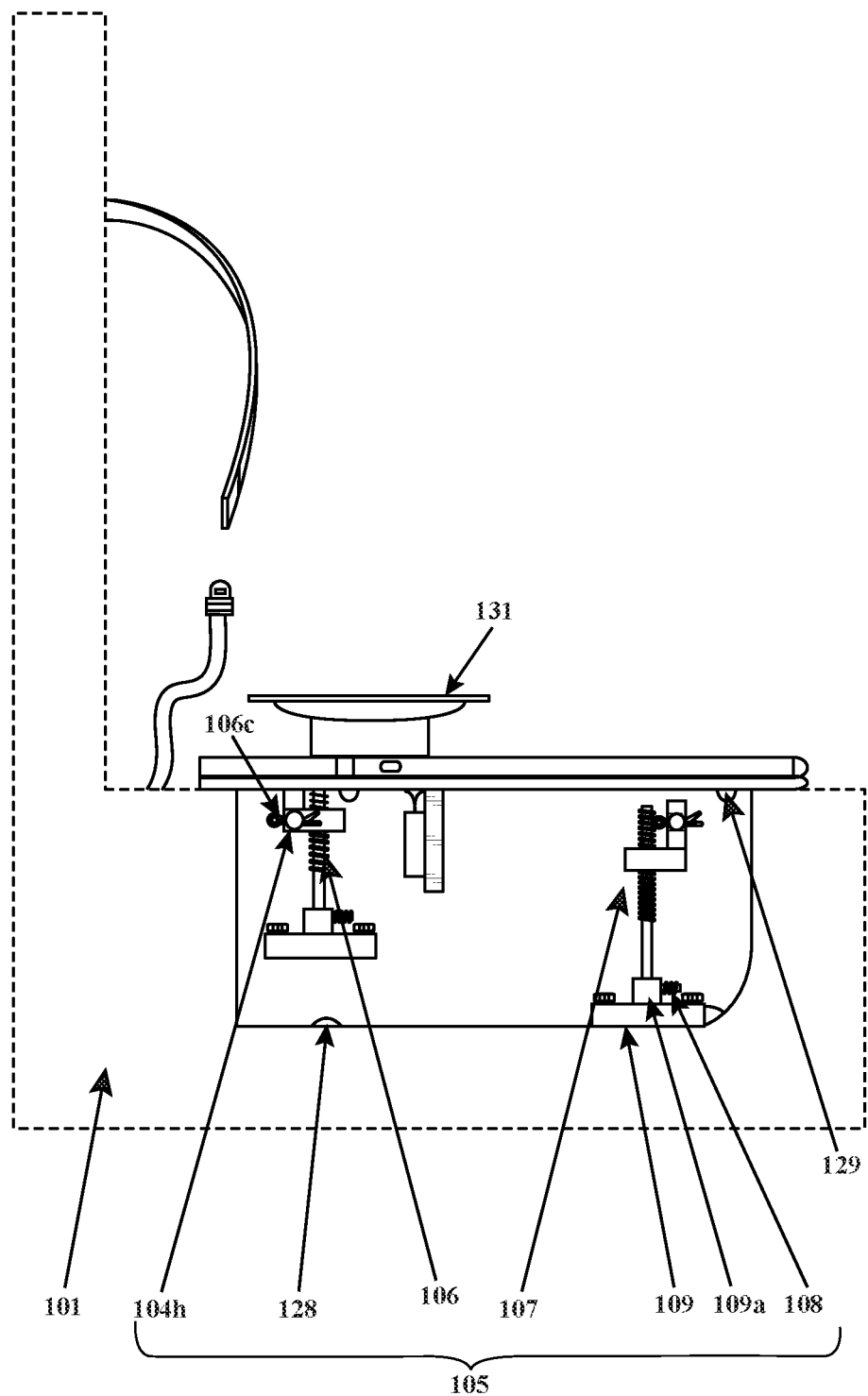
FIG. 9 exemplarily illustrates a right-side view of the concealed toilet.
Figure 10:
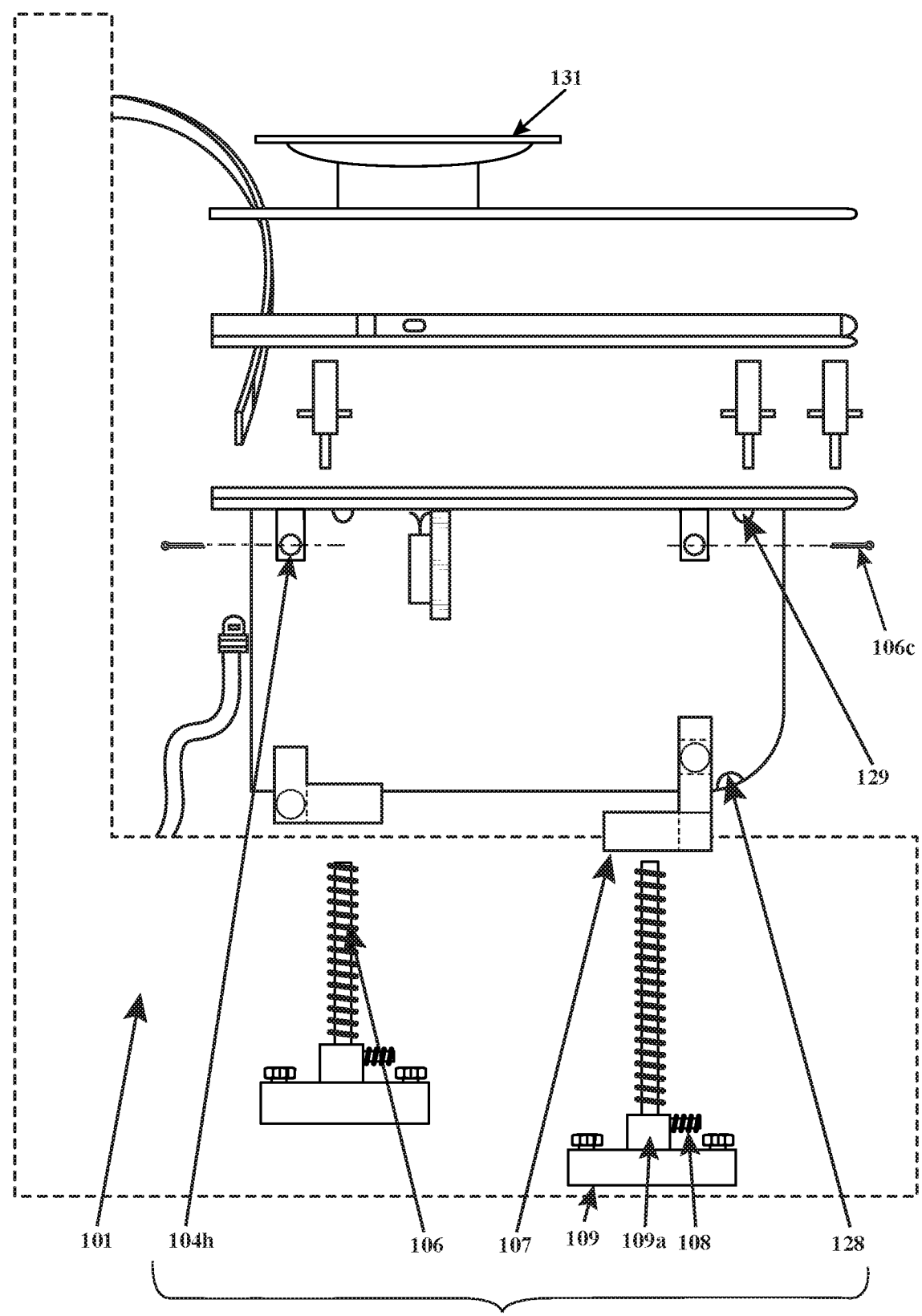
FIG. 10 exemplarily illustrates an exploded right-side view of the concealed toilet.

FIG. 9 exemplarily illustrates a right-side view of the concealed toilet 100. FIG. 10 exemplarily illustrates an exploded right-side view of the concealed toilet 100. As exemplarily illustrated and disclosed in the detailed description of FIG. 6, the concealed toilet 100 comprises the flexible container 102, the bag fasteners 128, the foundation member 104, the primary toilet seat member 110, the lock hook assemblies 113a and 113b, and the secondary toilet seat member 131 that can be used by a child user. Moreover, the concealed toilet 100 is detachably mounted on the floor pan of the vehicle via the support assembly 105. As disclosed in the detailed description of FIGS. 1-2, the support assembly 105 comprises first interlocking elements 104a, internally threaded L-type adjustment fittings 107, externally threaded rods 106, and mounting flanges 109.

Figure 11:
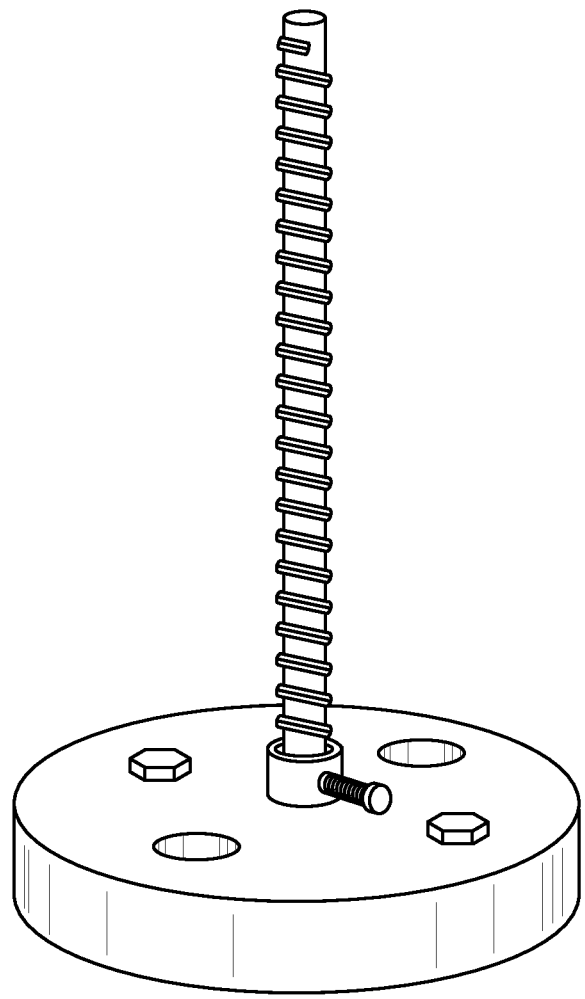
FIG. 11 exemplarily illustrates a perspective view of a portion of a support assembly of the concealed toilet.

FIG. 11 exemplarily illustrates a perspective view of a portion of a support assembly 105 of the concealed toilet 100. The portion of the support assembly 105 comprises a view of a portion of the externally threaded rod 106 proximal to the second end 106b of the externally threaded rod 106. The second end 106b of the externally threaded rod 106 is configured as a spherical bearing stud 106d which is inserted from a bottom surface of the mounting flange 109. A collar 137 is positioned around a peripheral portion of the externally threaded rod 106 proximal to the second end 106b such that a threaded hole 137a configured on the collar 137 matches a threaded hole configured on the externally threaded rod 106. During assembly, the threaded hole 137a is aligned with the threaded hole of the externally threaded rod 106 and an internally threaded lock screw and jam nut arrangement is threaded onto both the collar 137 and the externally threaded rod 106 sequentially. The mounting flanges 109 is fixedly attached to the floor pan of the vehicle using one or more fasteners 138, for example, bolt fasteners 138a, as exemplarily illustrated in FIGS. 2 and 11.

Figure 12:
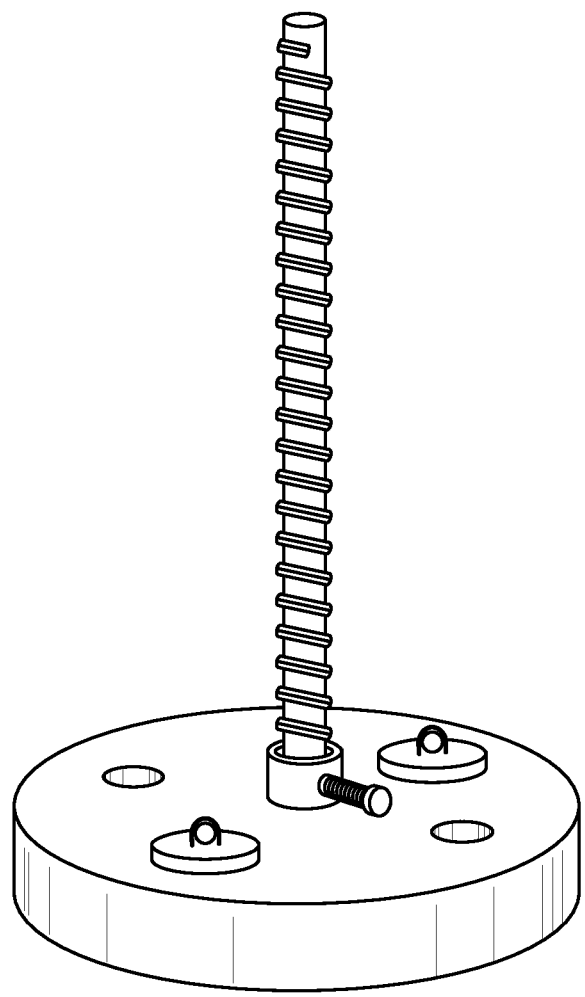
FIG. 12 exemplarily illustrates a perspective view of a portion of an embodiment of a support assembly of the concealed toilet.

FIG. 12 exemplarily illustrates a perspective view of a portion of an embodiment of a support assembly 105 of the concealed toilet 100. As exemplarily illustrated in FIG. 12, the portion of the support assembly 105 comprises an externally threaded rod 106, a collar 137, a lock screw and jam nut arrangement 108, a mounting flange 109, and one or more fasteners 138. In the embodiment, the portion of the support assembly 105 is assembled as described in the detailed description of FIG. 11, with the only difference being the fasteners 138 that are magnetic fasteners 138b.

FIG. 13 exemplarily illustrates an exploded view of a portion of the embodiment of the support assembly 105 of the concealed toilet illustrated in FIG. 12. FIG. 14 exemplarily illustrates a cross-sectional view of a portion of the embodiment of the support assembly 105 of the concealed toilet 100 illustrated in FIG. 12. The support assembly 105 comprises the external threaded rod 106, a collar 137, a lock screw and jam nut arrangement 108, a mounting flange 109, and one or more fasteners 138. The externally threaded rod 106 comprises a first end 106a and a second 106b configured as a spherical stud 106d. The externally threaded rod 106 is inserted into a cavity configured in the mounting flange 109 from the bottom of the flange 109 such that the spherical stud 106d snap fits into the cavity. The collar 137 is threaded onto the externally threaded rod 106 till the threaded hole 137a of the collar 137 aligns with the threaded hole of the externally threaded rod 106. The lock screw and jam nut arrangement 108 is threaded onto the collar 137 and the externally threaded rod 106 sequentially. Finally, the fasteners 138 that are magnetic fasteners 138b are inserted into receptacles 139b configured in the mounting flange 109 to magnetically attach to similar magnetic surfaces provided on the floor pan of the vehicle. In an embodiment, the fasteners 138 that are magnetic fasteners 138b comprise a cylindrical body 140, a flange 141, and a loop element 142 configured on a top surface of the flange 140. In an embodiment, the flange 141 of the magnetic fasteners 138b is 0.25 inches thick. The cylindrical body 140 is inserted into the receptacles 139b of the mounting flange 109. Moreover, the loop element 142 is provided to allow the magnetic fastener 138b to be removed using a suitable tool so that the support assembly 105 is conveniently dismantled.

The foregoing examples have been provided merely for explanation and are in no way to be construed as limiting of the concealed toilet 100 disclosed herein. While the concealed toilet 100 has been described with reference to various embodiments, it is understood that the words, which have been used herein, are words of description and illustration, rather than words of limitation. Furthermore, although the concealed toilet 100 has been described herein with reference to particular means, materials, and embodiments, the concealed toilet 100 is not intended to be limited to the particulars disclosed herein; rather, the concealed toilet 100 extends to all functionally equivalent structures, methods and uses, such as are within the scope of the appended claims. While multiple embodiments are disclosed, it will be understood by those skilled in the art, having the benefit of the teachings of this specification, that the concealed toilet 100 disclosed herein is capable of modifications and other embodiments may be effected and changes may be made thereto, without departing from the scope and spirit of the concealed toilet 100 disclosed herein.

I claim:

1. A concealed toilet for a vehicle seat, the concealed toilet comprising:
    a flexible container configured to be positioned in a cavity in the vehicle seat, wherein the flexible container comprises a waste containment bag disposed within the flexible container;
    a plurality of bag fasteners fixed at predetermined locations on inner surfaces of the flexible container for securing the waste containment bag to the inner surfaces of the flexible container within the space of the flexible container;
    a plurality of bag holders extending downward from underneath opposing sides of a foundation member for securing an upper portion of the waste containment bag that extends over the opposing sides of the foundation member;
    an elevated bag diverter extending from an upper surface of the foundation member for diverting the upper portion of the waste containment bag for preventing rupture of the waste containment bag;
    the foundation member attached to and protruding from an upper end of the flexible container for securing the flexible container to a floor pan of the vehicle via a support assembly;
    the support assembly fixedly attached to a lower surface of the foundation member, the support assembly comprising:
        a plurality of first interlocking elements positioned proximal to the lower surface of the foundation member;
        a plurality of L-type adjustment fittings, each of the L-type adjustment fittings comprising a second interlocking element defined on an upper leg and an internally threaded hole defined in a lower leg of each of the L-type adjustment fittings, wherein each of the second interlocking elements is configured to slidably accommodate one of the first interlocking elements;
        a plurality of externally threaded rods, each of the externally threaded rods comprising:
            a first end configured to be rotatably inserted into a corresponding one of the internally threaded hole of the L-type adjustment fitting, the L-type adjustment fitting positioned below the lower surface of the foundation member, wherein the L-type adjustment fitting is rotated on the externally threaded rods to move the foundation member between a first position and a second position along each of the externally threaded rods; and
            a second end comprising a spherical bearing stud;
        a plurality of mounting flanges configured to be fixedly attached to the floor pan of the vehicle, each of the mounting flanges comprising a socket located at a lower surface of the mounting flange, wherein the socket is configured to accommodate the spherical bearing stud at the second end of a corresponding one of the externally threaded rods, wherein each of the mounting flanges comprises a collar located on an upper surface of the mounting flange in communication with the socket; and
    a primary toilet seat member detachably attached to the upper surface of the foundation member, the primary toilet seat member comprising:
        a tapered guide stud extending downwardly from a lower surface of the primary toilet seat member for engaging with a hole defined in the foundation member; and
        lock posts extending outwardly from opposing sides of the primary toilet seat member;
    lock hook assemblies fixedly attached to the opposing sides of the foundation member, each of the lock hook assemblies comprising:
        a support structure fixedly attached to a corresponding one of the opposing sides of the foundation member;
        a pipe fixedly attached to the support structure;
        a spring accommodated in a space defined within the pipe, wherein the spring comprises a lock post hook extending from an upper end of the spring, wherein the lock post hook engages with one of the lock posts of the primary toilet seat member for securing the primary toilet seat member to the foundation member, and wherein a lower end of the spring is connected to the support structure; and
    a toilet seat cover comprising a concealment layer positioned on the primary toilet seat member for concealing the flexible container.

2. The concealed toilet of claim 1, wherein each of the collars comprises a threaded hole located along a perimeter of the collar.

3. The concealed toilet of claim 2 further comprises an internally threaded lock screw and jam nut arrangement threaded onto the each of the externally threaded rods through the threaded hole in the collar, wherein the internally threaded lock screw and jam nut arrangement is configured to fasten the externally threaded rod to the mounting flange and restrain angular movement of the foundation member.

4. The concealed toilet of claim 1, wherein the foundation member further comprises a tapered inner periphery for receiving and mating with a tapered inner periphery of the primary toilet seat member.

5. The concealed toilet of claim 1, wherein the toilet seat cover further comprises a tapered member extending downwardly from a lower surface of the concealment layer to mate with and fit into a tapered inner periphery of the primary toilet seat member.

6. The concealed toilet of claim 1, further comprising a secondary toilet seat member positioned within an opening defined by the primary toilet seat member, for use by a child user on removal of the toilet seat cover from the primary toilet seat member, wherein the secondary toilet seat member comprises:
    a base plate with a tapered outer periphery that securely fits within a tapered inner periphery of the primary toilet seat member; and
    a sleeve comprising an opening extending upwardly from an upper surface of the base plate for receiving sanitary waste from the child user, wherein the opening of the sleeve is in fluid communication with the waste containment bag in the space defined within the flexible container for transferring the sanitary waste from the child user to the waste containment bag.

7. The concealed toilet of claim 6, further comprising a lining positioned on inner surfaces of the opening of the sleeve of the secondary toilet seat member for sanitation purposes.

8. The concealed toilet of claim 6, wherein the upper surface of the base plate of the secondary toilet seat member is a cushioned surface.

9. The concealed toilet of claim 1, wherein the spring of the each of the lock hook assemblies further comprises a finger hook extending from the upper end of the spring for facilitating the engagement of the lock post hook with the one of the lock posts of the primary toilet seat member.

10. The concealed toilet of claim 1, wherein the each of the lock hook assemblies further comprises a spring stop positioned on an upper end of the pipe for precluding the spring from extending outwards of the pipe by resisting tension developed in the spring when the spring is pulled.

11. The concealed toilet of claim 1, wherein upper surfaces of the primary toilet seat member and the toilet seat cover are cushioned surfaces.

12. The concealed toilet of claim 1, wherein each of the first interlocking elements are configured to protrude substantially perpendicular relative to the flexible container.

13. The concealed toilet of claim 1, wherein the mounting flanges are fixed to the floor pan of the vehicle using one or more fasteners.

14. The concealed toilet of claim 13, wherein the one or more fasteners comprise one of a screw threaded fastener, a bolt fastener, and a magnetic fastener.

\* \* \* \* \*